United States Patent
Galvin et al.

(10) Patent No.: US 9,089,869 B2
(45) Date of Patent: Jul. 28, 2015

(54) ADHESIVE BEAD APPLICATOR

(75) Inventors: James Galvin, Cleveland, OH (US);
David L. Kunkle, Chelsea, MI (US);
James D. Haaser, Lancaster, OH (US);
Paul Snowwhite, Dexter, MI (US)

(73) Assignee: ADCO Products, LLC, Michigan Center, MI (US)

( * ) Notice: Subject to any disclaimer, the term of this patent is extended or adjusted under 35 U.S.C. 154(b) by 177 days.

(21) Appl. No.: 13/246,482

(22) Filed: Sep. 27, 2011

(65) Prior Publication Data

US 2012/0042826 A1  Feb. 23, 2012

Related U.S. Application Data

(63) Continuation-in-part of application No. 13/143,294, filed as application No. PCT/US2011/024898 on Feb. 15, 2011.

(60) Provisional application No. 61/386,939, filed on Sep. 27, 2010, provisional application No. 61/305,893, filed on Feb. 18, 2010.

(51) Int. Cl.
| | |
|---|---|
| *B05C 9/00* | (2006.01) |
| *B65D 35/22* | (2006.01) |
| *B05C 11/10* | (2006.01) |
| *B05B 15/04* | (2006.01) |

(Continued)

(52) U.S. Cl.
CPC ........... *B05C 5/0279* (2013.01); *B01F 15/0412* (2013.01); *B05B 9/007* (2013.01); *B05B 13/005* (2013.01); *B05C 11/1036* (2013.01); *B05C 17/00589* (2013.01); *B32B 37/1284* (2013.01); *B65D 77/067* (2013.01); *E04D 15/00* (2013.01); *B32B 2037/1253* (2013.01); *B32B 2038/0084* (2013.01); *B65D 77/065* (2013.01)

(58) Field of Classification Search
USPC ........................ 118/313–315; 222/129–145.8
See application file for complete search history.

(56) References Cited

U.S. PATENT DOCUMENTS

| | | |
|---|---|---|
| 2,950,029 A | 8/1960 | Winstead |
| 3,042,271 A | 7/1962 | Winstead |

(Continued)

FOREIGN PATENT DOCUMENTS

WO  WO2011103094 A2  8/2011

OTHER PUBLICATIONS

Lauren R. Hartman, Innovations break through packaging barriers, DIALOG® File 148: Gale Group Trade & Industry DB © 2011 Gale/Gengage, Packaging Digest, v34, n12, p. 44(5), Nov. 1997.

(Continued)

*Primary Examiner* — Dah-Wei D Yuan
*Assistant Examiner* — Binu Thomas
(74) *Attorney, Agent, or Firm* — Benesch Friedlander Coplan & Aronoff LLP

(57) ABSTRACT

A device for applying a two-part adhesive to a substrate includes a carrier, a first pump, a second pump, at least one manifold and at least one applicator. The first pump and the second pump are mounted on the carrier and each pump has an inlet and an outlet. The first pump pumps a first part of the two-part adhesive from its inlet to its outlet, and the second pump pumps a second part of the two-part adhesive from its inlet to its outlet. The at least one applicator is configured to mix the first part with the second part to form the two-part adhesive that is discharged from the outlet of the at least one applicator onto the substrate.

15 Claims, 15 Drawing Sheets

(51) Int. Cl.
*B05C 5/02* (2006.01)
*B65D 77/06* (2006.01)
*B05C 17/005* (2006.01)
*B05B 13/00* (2006.01)
*B05B 9/00* (2006.01)
*B01F 15/04* (2006.01)
*B32B 37/12* (2006.01)
*E04D 15/00* (2006.01)
*B32B 38/00* (2006.01)

(56) References Cited

U.S. PATENT DOCUMENTS

| | | | |
|---|---|---|---|
| 3,321,125 A | | 5/1967 | Quackenbush |
| 3,599,840 A | | 8/1971 | Speas |
| 4,252,274 A | | 2/1981 | Kubacak |
| 4,535,919 A | | 8/1985 | Jameson |
| 4,789,100 A | | 12/1988 | Senf |
| 4,925,370 A | * | 5/1990 | Tallarita ............... 417/15 |
| 4,963,391 A | * | 10/1990 | Bair et al. ............ 427/116 |
| 5,390,825 A | * | 2/1995 | Rockel ................. 222/135 |
| 5,494,228 A | | 2/1996 | Eaton et al. |
| 5,573,148 A | | 11/1996 | Poole et al. |
| 6,220,526 B1 | | 4/2001 | Johnson |
| 6,422,428 B1 | | 7/2002 | Allen et al. |
| 6,802,879 B2 | | 10/2004 | Scanlon |
| 6,942,735 B2 | | 9/2005 | Rich |
| 6,962,455 B2 | | 11/2005 | Kugler et al. |
| 7,048,145 B2 | | 5/2006 | Mitchell |
| 7,056,556 B2 | | 6/2006 | Burns |
| 7,367,515 B1 | | 5/2008 | Newman |
| 7,413,132 B1 | | 8/2008 | Bogart |
| 7,626,143 B2 | | 12/2009 | Miller |
| 8,113,385 B2 | | 2/2012 | Choiniere et al. |
| 8,342,372 B2 | | 1/2013 | Choiniere et al. |
| 2002/0063760 A1 | | 5/2002 | Dietl et al. |
| 2002/0169271 A1 | | 11/2002 | Peng et al. |
| 2004/0028458 A1 | | 2/2004 | Heathcock et al. |
| 2005/0028938 A1 | * | 2/2005 | Hill ..................... 156/548 |
| 2005/0081784 A1 | * | 4/2005 | Sakayori et al. ...... 118/305 |
| 2007/0000947 A1 | * | 1/2007 | Lewis et al. .......... 222/132 |
| 2008/0123466 A1 | | 5/2008 | Thompson et al. |
| 2011/0031270 A1 | * | 2/2011 | Choiniere et al. ........ 222/1 |
| 2012/0181301 A1 | | 7/2012 | Choiniere et al. |

OTHER PUBLICATIONS

A.J. Lazarus Associates, Inc., Quick Connect/Disconnect Valve for Precise, Safe Dispensing Offered by Hedwin Corporation, Trade/Newswire, Pearl River, N.Y., Apr. 15, 1987.

USPTO Non-Final Office Action notification date of Apr. 22, 2015 for U.S. Appl. No. 13/143,294 pp. 1-20.

USPTO Office Action dated Feb. 11, 2015 for U.S. Appl. No. 13/399,425 pp. 1-8.

USPTO Office Action dated Sep. 9, 2014 for U.S. Appl. No. 13/399,417 pp. 1-31.

* cited by examiner

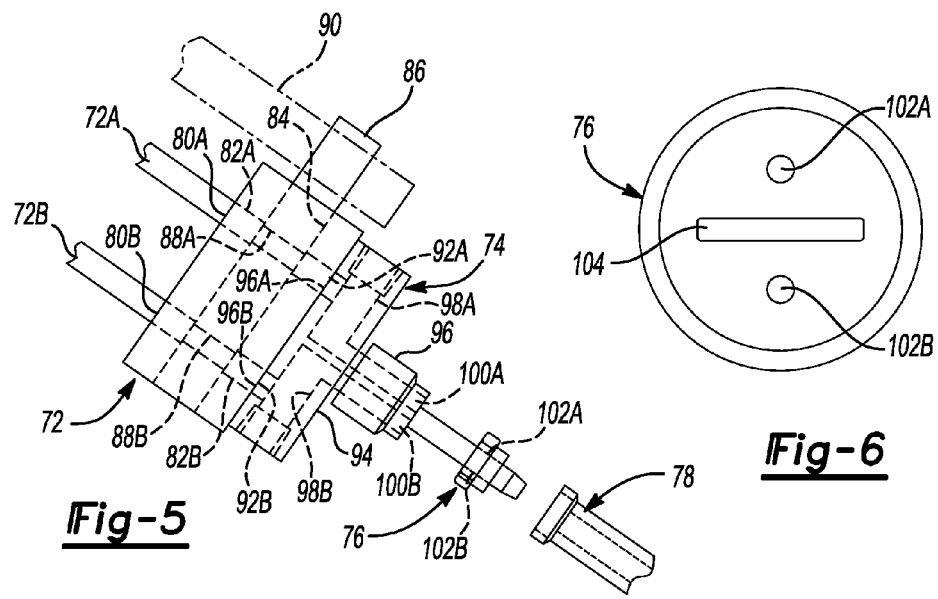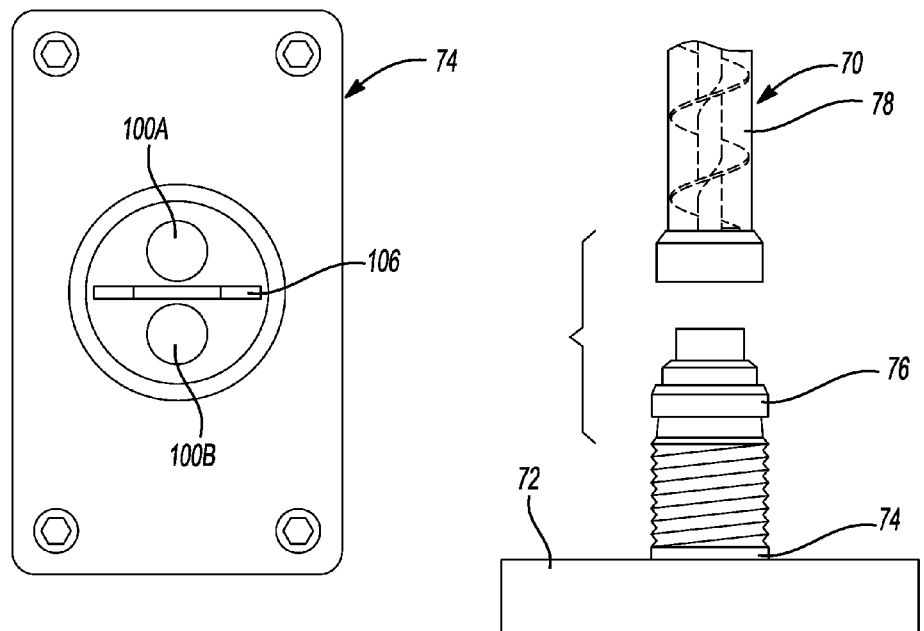

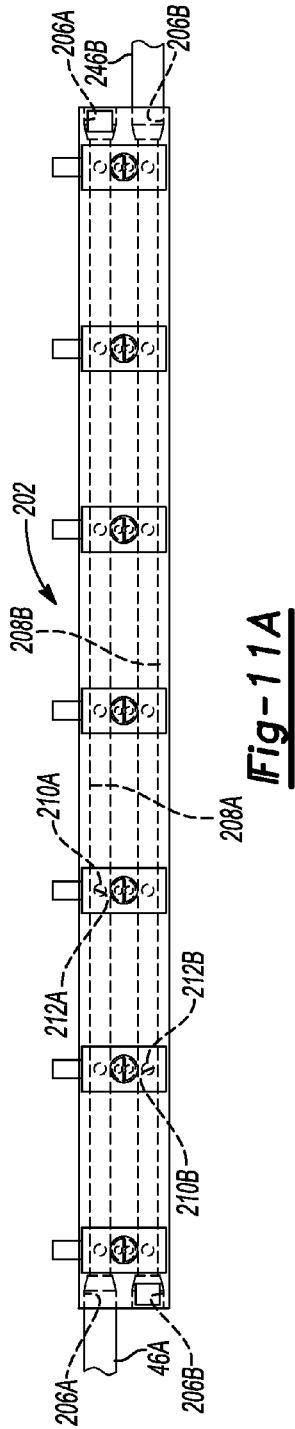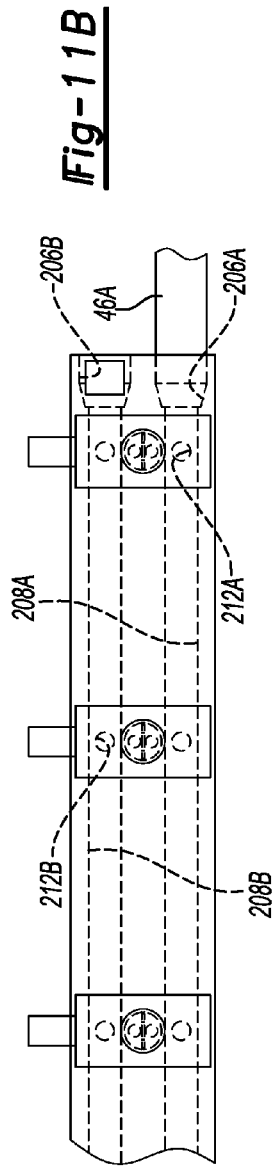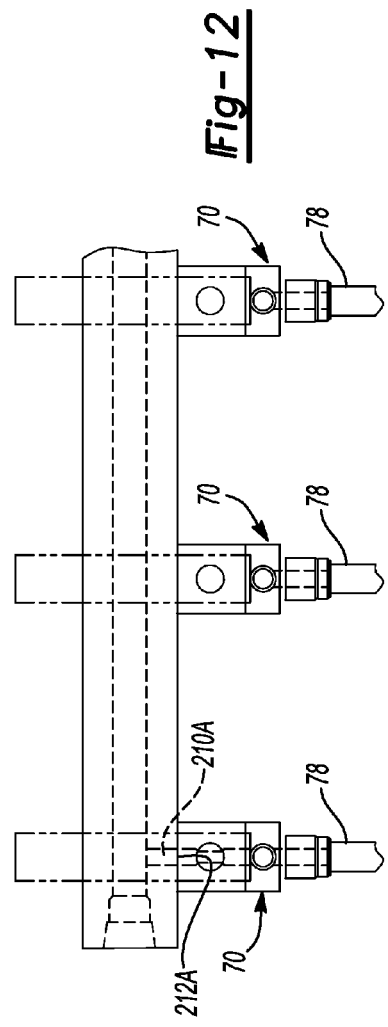

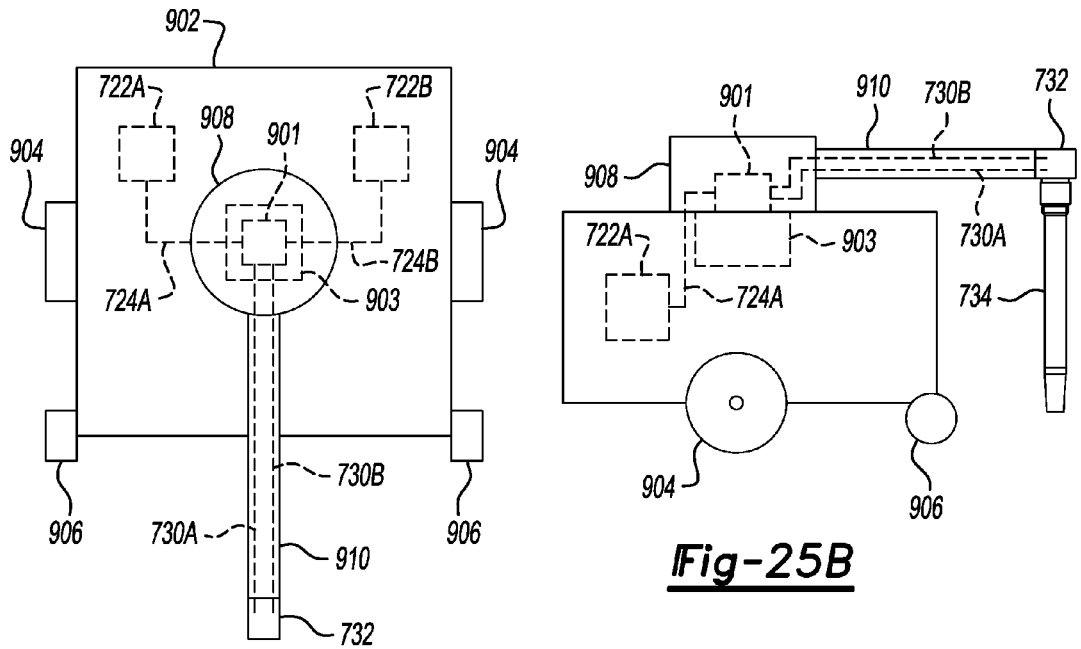
*Fig-25A*
*Fig-25B*
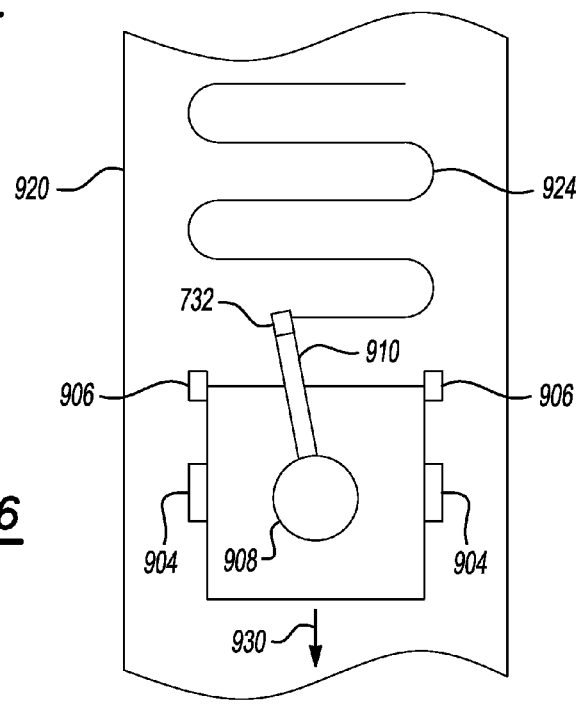
*Fig-26*

ADHESIVE BEAD APPLICATOR

RELATED APPLICATION

This application is a continuation in part U.S. application Ser. No. 13/143,294, filed Jul. 5, 2011, which is a U.S. national stage application of International Patent Application No. PCT/US11/24898, filed Feb. 15, 2011, which claims the benefit of U.S. Provisional Application No. 61/305,893, filed Feb. 18, 2010. This application also claims the benefit of U.S. Provisional Application No. 61/386,939, filed Sep. 27, 2010. The contents of the above applications are incorporated herein by reference in their entirety.

TECHNICAL FIELD

The present invention relates to a single or multi-bead applicator for dispensing an all weather adhesive on a roofing substrate, and more particularly to a single or multi-bead applicator for dispensing an all weather two-part foamable adhesive.

BACKGROUND

The statements in this section merely provide background information related to the present disclosure and may or may not constitute prior art.

In many roofing applications, for example in large, flat commercial roof decks, a roofing membrane is used to seal and protect the roof deck from environmental weather conditions. The roofing membrane may be made of various materials, such as polymeric materials including EPDM (ethylene propylene diene M-rubber) or TPO (thermoplastic polyolefin). The roofing membrane is adhered overtop insulation boards or panels. The insulation boards are typically secured to the roofing substrate or roof deck via an adhesive composition. A conventional adhesive composition used to adhere the insulation boards to the roof deck includes polyurethane. The polyurethane adhesives are oftentimes applied directly onto the roof deck via an applicator system and the insulation boards are then laid onto the roof deck surface. Conventional polyurethane adhesives oftentimes include two separate parts that are mixed by an applicator just prior to being applied onto the surface of the roof deck. The two parts include an isocyanate blend and a simple polyol blend. Upon mixing, the isocyanate blend reacts or crosslinks with the simple polyol blend to form the polyurethane adhesive.

However, these conventional two-part polyurethane adhesives are sensitive to weather conditions due to the effects of temperature on the viscosity, and therefore the reaction speed, of the adhesive. Accordingly, conventional two-part polyurethane adhesives are packaged and formulated into various grades, such as Summer, Winter, and Regular, that vary the composition of the adhesive in order to account for temperature.

Therefore, there is room in the art for a pump driven applicator system that reliably pumps adhesives of different viscosities.

SUMMARY

A device for applying a two-part adhesive to a substrate includes a carrier, a first pump, a second pump, at least one manifold and at least one applicator. The first pump and the second pump are mounted on the carrier and each pump has an inlet and an outlet. The first pump pumps a first part of the two-part adhesive from its inlet to its outlet, and the second pump pumps a second part of the two-part adhesive from its inlet to its outlet. The at least on manifold has a pair of inlets in communication with the outlets of the first pump and the second pump and further has a pair of outlets in communication with respective inlets of the manifold. The at least on applicator includes a first inlet, a second inlet, and an outlet. The first inlet of the at least one applicator is in communication with one of the outlets of the at least one manifold and the second inlet of the at least one applicator is in communication with the other outlet of the manifold. The at least one applicator is configured to mix the first part with the second part to form the two-part adhesive that is discharged from the outlet of the at least one applicator onto the substrate.

Further features, advantages, and areas of applicability will become apparent from the description provided herein. It should be understood that the description and specific examples are intended for purposes of illustration only and are not intended to limit the scope of the present disclosure.

DRAWING DESCRIPTION

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 5 is a side view of a manifold used with the device;

FIG. 6 is a front view of a connector used with the device;

FIG. 7 is a front view of another connector used with the device;

FIG. 8 is an exploded side view of the connectors shown in FIGS. 6 and 7 with a removable wand;

FIG. 11A is front view of a manifold used with the device;

FIG. 11B is a front view of a portion of the manifold shown in FIG. 11A;

FIG. 12 is a top view of connectors used with the device;

FIG. 25A is a top view of yet another embodiment of the device;

FIG. 25B is a side view of the device shown in FIG. 25A; and

FIG. 26 shows the device of FIGS. 25A and 25B dispensing an adhesive onto a substrate as a serpentine path.

DETAILED DESCRIPTION

The following description is merely exemplary in nature and is not intended to limit the present disclosure, application, or uses.

Figure 1:
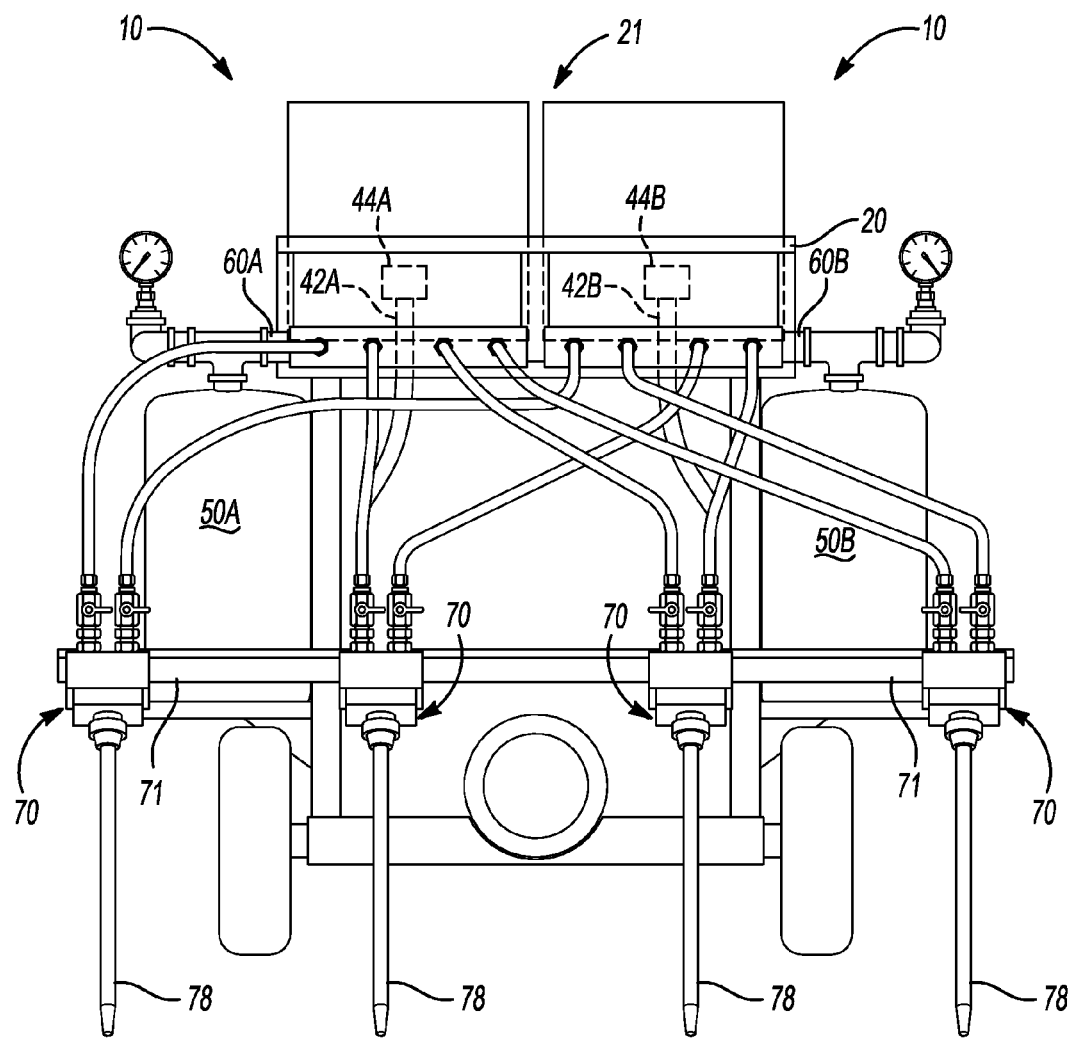
FIG. 1 is a front view of a device for applying a two-part adhesive.
Figure 2:
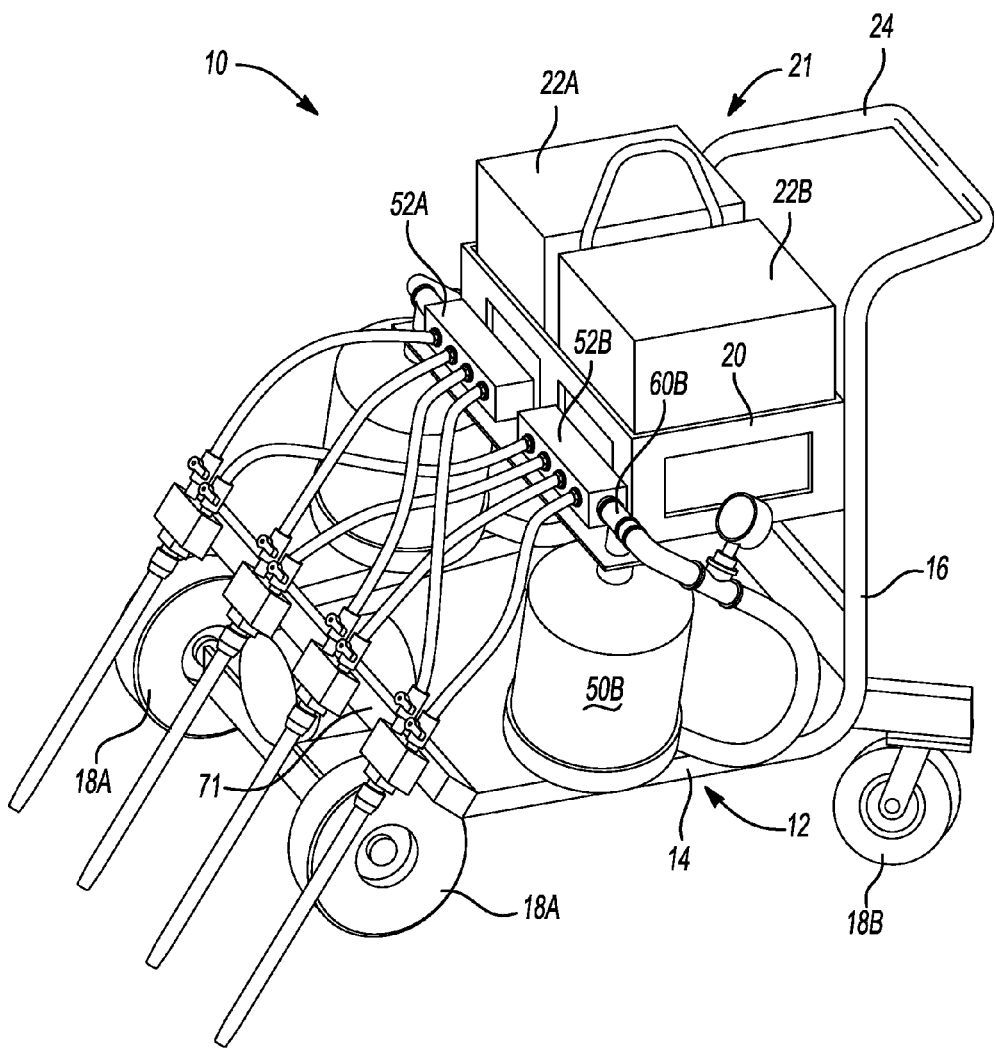
FIG. 2 is a front perspective view of the device.

Referring to FIGS. 1 and 2, a device for applying a two-part fluid to a substrate is generally indicated by reference number 10. The device 10 includes a carrier or frame 12. The carrier or frame 12 is used to support the various components of the device 10 and may take many forms without departing from the scope of the present invention. In the example provided, the carrier 12 includes a rectangular base 14 with an upwardly extending portions or support columns 16. The rectangular portion includes two rotatable front wheels 18A and two spindle mounted back wheels 18B. Back wheels 18B are pivotable and rotatable allowing the device 10 to move forward as well as turn and rotate. The portion 16 supports an upper frame 20. The upper frame 20 is sized to receive two parts of a two-part compound 21. These two parts are packaged separately and include an "A" side package 22A and a "B" side package 22B. Each of the packages preferably contain one part of a two part all weather polyurethane adhesive for use on roofing substrates. The upper frame 20 is designed to accommodate a particular package configuration of the A side 22A and the B side 22B. While in the example provided the A side 22A and B side 22B are illustrated as having a rectangular box packaging system, it should be appreciated that other shaped packaging systems may be supported by the upper frame 20. A handle portion 24 extends out from the upper frame 20 or alternatively from the portion 16 of the frame 12.

Figure 3:
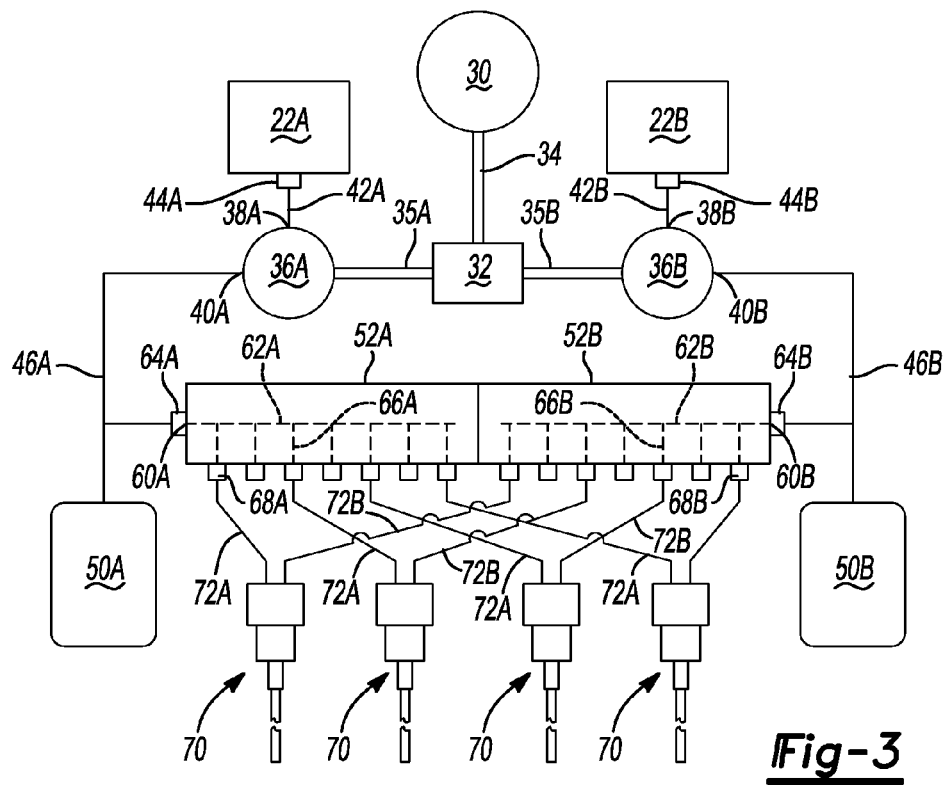
FIG. 3 is a schematic diagram of the device.
Figure 4:
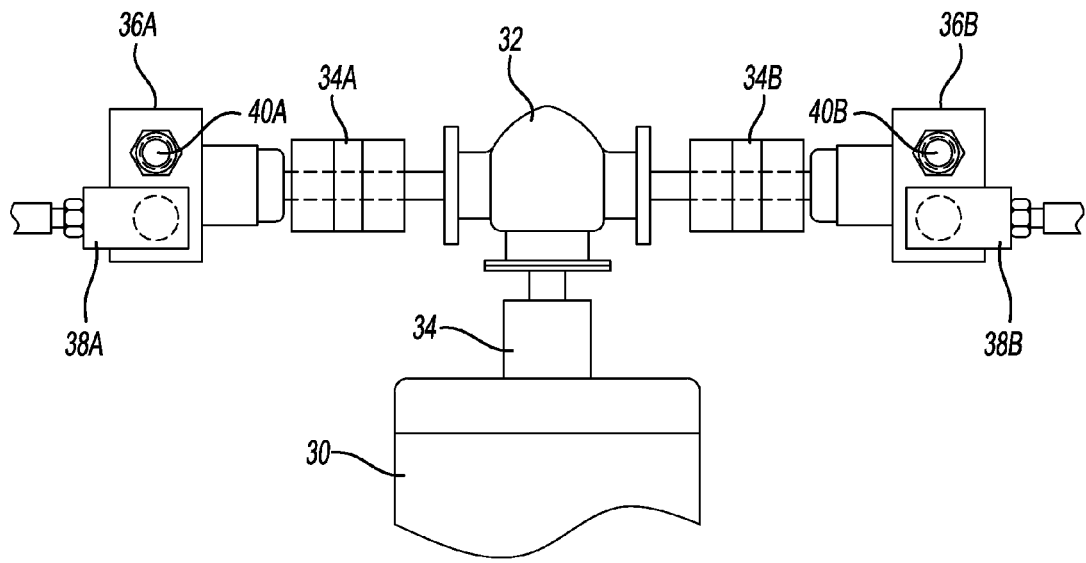
FIG. 4 is a view of a portion of the device showing a prime mover and gear box connection.

Turning to FIGS. 3 and 4, the device 10 includes a prime mover 30 fixed or otherwise connected to the carrier 12. The prime mover 30 is preferably an electric motor, though it should be appreciated that the prime mover 30 may be any type of engine, such as a combustion engine, without departing from the scope of the present invention. The prime mover 30 is connected to a gear box 32 via a rotatable shaft 34. The gear box 32 is fixed or otherwise connected to the carrier 12. The gearbox 32 transfers torque from the prime mover 30 to first and second rotatable shafts 34A and 34B. The rotatable shafts 35A and 35B are coupled to a first and second pump 36A and 36B, respectively. Each pump 36A and 36B includes an inlet 38A and 38B, respectively, and an outlet 40A and 40B, respectively. In addition, the prime mover 30 may be connected to the wheels 18B or 18A to provide a self-propelled configuration for the device 10 controlled by a throttle (not shown).

Returning to FIGS. 1 and 2, and with reference to FIGS. 3 through 8, the inlet 38A is connected via a hose or other fluid passage 42A to the A side package 22A of the two-part compound 21. In the example provided, the hose 42A is connected to a quarter turn connector 44A located on a bottom of the A side package 22A. However, it should be appreciated that various other connection devices may be employed. The connector 44A extends through an opening in the bottom of the upper frame 20. Likewise, the inlet 38B is connected via a hose or other fluid passage 42B to the B side package 22B of the two-part compound 21. In the example provided, the hose 42B is connected to a quarter turn connector 44B located on a bottom of the B side package 22B. However, it should be appreciated that various other connection devices may be employed. The connector 44B extends through an opening in the bottom of the upper frame 20. The connectors 44A, 44B may be keyed connectors such that the connector 44A can only connect to the hose 42A and the connector 44B can only connect to the hose 44B, thereby preventing switching the A and B packages 22A, 22B on the device 10.

The outlet 40A of the pump 36A is connected via hose or other type of fluid passage 46A to an accumulator 50A and a manifold 52A. The accumulator 50A is an energy storage device in which a non-compressible fluid is held under pressure by an external source. In the example provided, the accumulator 50A is a gas filled type accumulator having a compressible gas that acts on a bladder within the accumulator to provide a compressive force on fluid within the accumulator 50A. However, it should be appreciated that the accumulator 50A may be of other types, such as a spring type, without departing from the scope of the present invention.

The manifold 52A is attached to a front of the upper frame 20. The manifold 52A includes an inlet port 60A that connects with the hose 46A. In one embodiment, the manifold 52A includes an inlet port 60A that communicates with a bore 62A that extends through the manifold 52A. A ball valve 64A is preferably disposed within the inlet port 60A and connects the hose 46A with the bore 62A. The bore 62A communicates with a plurality of perpendicularly extending side bores 66A. The side bores 66A each communicate with an outlet port 68A on the manifold 52A. In the example provided, there are seven side bores 66A and seven outlet ports 68A. However, it should be appreciated that any number of side bores 66A and outlet ports 68A may be employed without departing from the scope of the present invention.

Each of the outlet ports 68A may be optionally connected to one of a plurality of applicator units 70 via hoses or other fluid passages 72A. In the example provided, four applicator units 70 are illustrated with four hoses 72A connecting each of the applicator units 70 with one of the outlet ports 68A. However, it should be appreciated that the manifold 52A can accommodate up to seven applicator units 70. The manifold 52A allows each applicator unit 70 to receive a flow of "A" side fluid from the "A" side package 22A.

The outlet 40B of the pump 36B is connected via hose or other type of fluid passage 46B to an accumulator 50B and a manifold 52B. The accumulator 50B is an energy storage device in which a non-compressible fluid is held under pressure by an external source. In the example provided, the accumulator 50B is a gas filled bladder type accumulator having a compressible gas that provides a compressive force on fluid via the bladder within the accumulator 50B. However, it should be appreciated that the accumulator 50B may be of other types, such as a spring type, without departing from the scope of the present invention.

The manifold 52B is attached to a front of the frame 20. The manifold 52B includes an inlet port 60B that connects with the hose 46B. In one embodiment, the manifold 52B includes an inlet port 60B that communicates with a bore 62B that extends through the manifold 52B. A ball valve 64B is preferably disposed within the inlet port 60B and connects the hose 46B with the bore 62B. The bore 62B communicates with a plurality of perpendicularly extending side bores 66B. The side bores 66B each communicate with an outlet port 68B on the manifold 52B. In the example provided, there are seven side bores 66B and seven outlet ports 68B. However, it should be appreciated that any number of side bores 66B and outlet ports 68B may be employed without departing from the scope of the present invention.

Each of the outlet ports 68B may be optionally connected to one of a plurality of the applicator units 70 via hoses or other fluid passages 72B. In the example provided, the four applicator units 70 are illustrated with four hoses 72B connecting each of the applicator units 70 with one of the outlet ports 68B. However, it should be appreciated that the manifold 52B can accommodate up to up to seven applicator units 70. The manifold 52B allows each applicator unit 70 to receive a flow of "B" side fluid from the "B" side package 22B separately from the fluid from the "A" side package 22A.

With specific reference to FIGS. 1, 2 and 5, the applicator units 70 are mounted on a front beam 71 attached to the carrier 12 and each applicator unit 70 includes a rotary valve 72, a dual manifold 74, an orifice restrictor 76, and a nozzle 78. As illustrated in FIG. 5, the rotary valve 72 includes an inlet port 80A and an inlet port 80B. The inlet port 80A is connected with the hose 72A to receive "A" side fluid and the inlet port 80B is connected with the hose 72B to receive "B" side fluid. The inlet port 80A communicates with a bore 82A and the inlet port 80B communicates with a bore 82B. The bores 82A and 82B are separate and do not communicate with one another. Each bore 82A and 82B extend through the rotary valve 72 parallel to one another. A shaft bore 84 is located in the rotary valve and perpendicularly intersects both the bores 82A and 82B. A rotatable shaft 86 is disposed within the shaft bore 84. The rotatable shaft 86 includes two spaced apart holes 88A and 88B that extend through the diameter of the shaft 86. The spaced apart holes 88A and 88B are in alignment with the bores 82A and 82B, respectively. The shaft 86 is connected to a lever 90. Alternatively, the shaft 86 may be connected via a rigid or wire connection to a lever or other device connected with the handle 24 of the carrier 12. By rotating the shaft 86, the holes 88A and 88B are simultaneously moved in and out of alignment with the bores 82A and 82B. Accordingly, the rotary valve 72 is operable to throttle the fluid flow of the "A" and "B" side fluids through the applicator unit 70. The rotary valve 72 further includes bolt channel outlet ports 92A and 92B that communicate with the bores 82A and 82B, respectively.

With specific reference to FIGS. 5, 6 and 7, the dual manifold 74 includes a body portion 94 and a neck portion 96 that extends out from the body portion 94. The dual manifold 74 includes inlet ports 96A and 96B that are connected to the bolt outlet ports 92A and 92B, respectively, of the rotary valve 72. The inlet ports 96A and 96B communicate with separate channels or bores 98A and 98B, respectively, that communicate through the body portion 94 and into the neck portion 96 to outlet ports 100A and 100B, respectively.

The orifice restrictor 76 is sealingly engaged to the neck portion 96 of the dual manifold 74. The orifice restrictor 76 includes a first orifice 102A and a second orifice 102B that communicate with the outlet ports 100A and 100B, respectively. The orifices 102A and 102B are separate and do not communicate with each other. In the example provided, the orifice restrictor 76 includes a slot 104 sized to receive a tab member 106 located on the neck portion 96 of the dual manifold 74, as shown in FIGS. 6 and 7. The tab member 106 assures that the first orifice 102A and the second orifice 102B do not communicate. The first orifice 102A has a diameter different than the second orifice 102B. For example, the first orifice 102A has a diameter that is a function of the material characteristics of the composition of the "A" side fluid. The second orifice 102B has a diameter that is a function of the material characteristics of the composition of the "B" side fluid. The orifices 102A and 102B assure that fluid does not backflow into the dual manifold 74, as will be described below. The orifices 102A, 102B allow high viscosity compound to be ported therethrough. Combined with the configuration of the pumps 36A and 36B, the device 10 is operable to pump compounds having viscosities higher than 2500 Pas, and preferably as high as about 7000 Pas.

Turning to FIG. 8, the nozzle 78 is an extended member that mixes the "A" side fluid with the "B" side fluid. The nozzle 78 is coupled to the orifice restrictor 76 and communicates with the orifices 102A and 102B. The nozzle 78 is disposable and is preferably a 36 element mixing nozzle, though it should be appreciated that other types and grades of nozzles may be employed without departing from the scope of the present invention. Once the fluids from the "A" and "B" sides are mixed, the combined fluid exits in the nozzle 78 and is dispensed in the form of elongated beads on the roofing substrate.

With combined reference to FIGS. 1-8, the operation of the device 10 will now be described. An operator of the device 10 activates the prime mover 30 which in turn drives the pumps 36A and 36B. The pumps 36A and 36B suck fluid from the "A" and "B" side packages 22A and 22B via hoses 42A and 42B, respectively. "A" side fluid exits the pump 36A via outlet port 40A and enters the hose 46A. An amount of "A" side fluid enters the accumulator 50A and charges the accumulator 50A. In the example provided, the accumulator 50A preferably stores the fluid at approximately 300 psi. The remaining "A" side fluid enters the manifold 52A and is communicated through the central bore 62A to the side bores 66A. The "A" side fluid then exits the manifold 52A and communicates via hose 72A to the rotary valve 74 of the applicator unit 70. The "A" side fluid communicates through the rotary valve 74 and is throttled based on the rotational position of the shaft 86. The "A" side fluid exits the rotary valve 74, communicates through the dual manifold 76 and the orifice restrictor 76 and enters the nozzle 78 for mixing.

Likewise, "B" side fluid exits the pump 36B via outlet port 40B and enters the hose 46B. An amount of "B" side fluid enters the accumulator 50B and charges the accumulator 50B. In the example provided, the accumulator 50B preferably stores the fluid at approximately 300 psi. The remaining "B" side fluid enters the manifold 52B and is communicated through the central bore 62B to the side bores 66B. The "B" side fluid then exits the manifold 52B and communicates via hose 72B to the rotary valve 74 of the applicator unit 70. The "B" side fluid communicates through the rotary valve 74 and is throttled based on the rotational position of the shaft 86. The "B" side fluid exits the rotary valve 74, communicates through the dual manifold 76 and the orifice restrictor 76 and enters the nozzle 78 for mixing with the "A" side fluid. The mixed adhesive is then dispensed from the nozzle 78 onto a substrate. By widening the distance between nozzles 78 or the number of nozzles 78, areas may be covered exceeding 40 inches in width.

While the orifice restrictor 76 and the nozzle 78 are disposable, it is desireable that the dual manifold 74 and rotary valve 76 do not become clogged with mixed and cured fluid. However, once the device 10 is deactivated, mixed fluid within the nozzle 78 may cure and expand, forcing mixed fluid back towards the orifice restrictor 76. However, as the pumps 36A and 36B are deactivated, the accumulators 50A and 50B begin to discharge, providing a positive pressure of fluid back towards the orifice restrictor 76. The back pressure provided by the accumulators 50A and 50B, in conjunction with the sizes of the orifices 102A and 102B, prevent mixed material within the nozzle 78 from entering the dual manifold 74.

Figure 9:
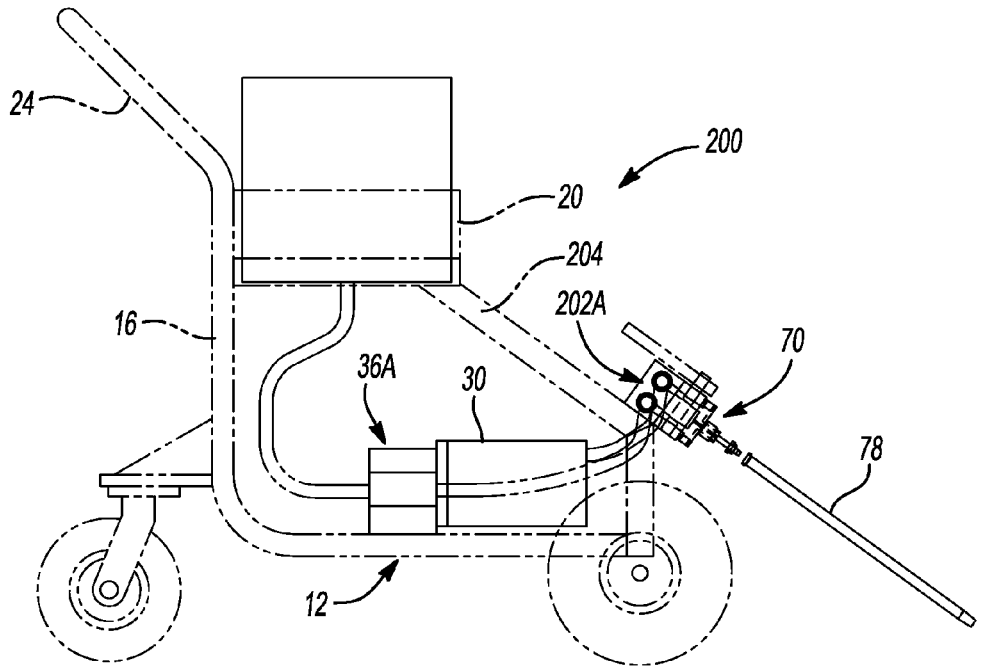
FIG. 9 is a side view of another embodiment of the device.

Turning to FIG. 9, an alternate embodiment of the device 10 is generally indicated by reference number 200. The device 200 is similar to the device 10 described in FIGS. 1-8, and therefore like components are indicated by like reference numbers. However, the device 200 includes at least one dual channel manifold 202. The dual channel manifold or adapter base plate 202 is located on a forward support member 204 of the carrier 12.

Figure 10:
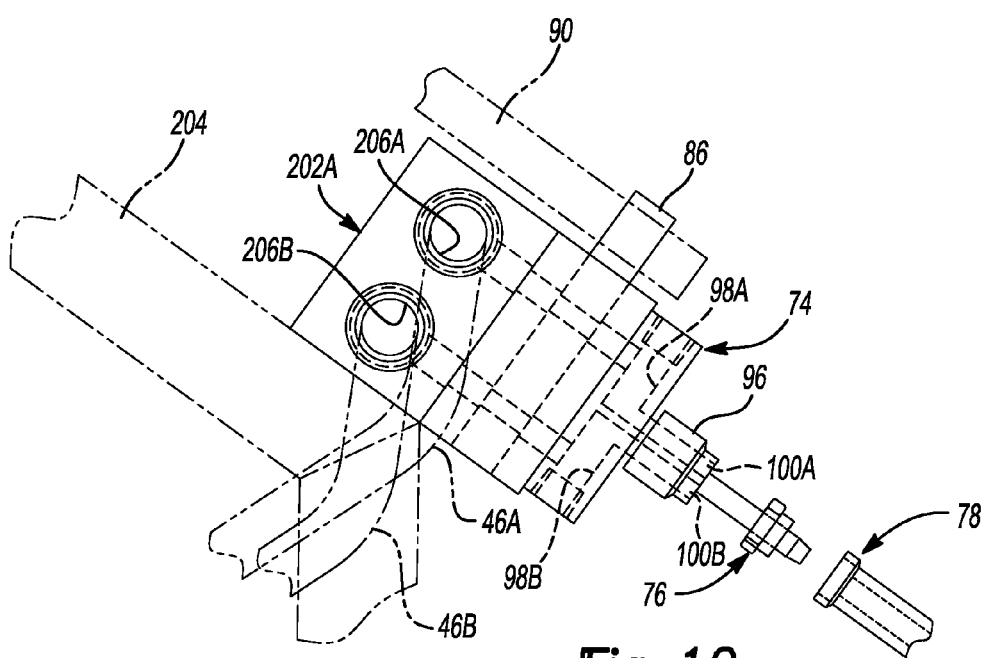
FIG. 10 is a side view of another manifold used with the device.

With reference to FIGS. 10-12, the dual channel manifold 202 includes a pair of inlet ports 206A located on opposite ends of the manifold 202 and a pair of inlet ports 206B located on opposite ends of the manifold. The inlet ports 206A communicate with a first bore 208A that extends along a length of the manifold 202. The inlet ports 206B communicate with a second bore 208B that extends along the length of the manifold 202 parallel to the first bore 208A. The manifold 202 includes side bores 210A that communicate with the first bore 208A and with outlets 212A located along the length of the manifold 202. Similarly, the manifold 202 includes side bores 210A that communicate with the first bore 208A and with outlets 212A located along the length of the manifold 202. One of the inlets 206A is connected with the hose 46A while the opposite inlet 206A is plugged. One of the inlets 206B is connected with the hose 46B while the opposite inlet 206B is plugged. The outlets 212A communicate directly with the inlets 80A of the rotary valves 76 and the outlets 212B communicate directly with the inlets 80B of the rotary valves 76. Accordingly, each applicator unit 70 is fed "A" and "B" side fluids separately directly from the manifold 202.

Figure 13:
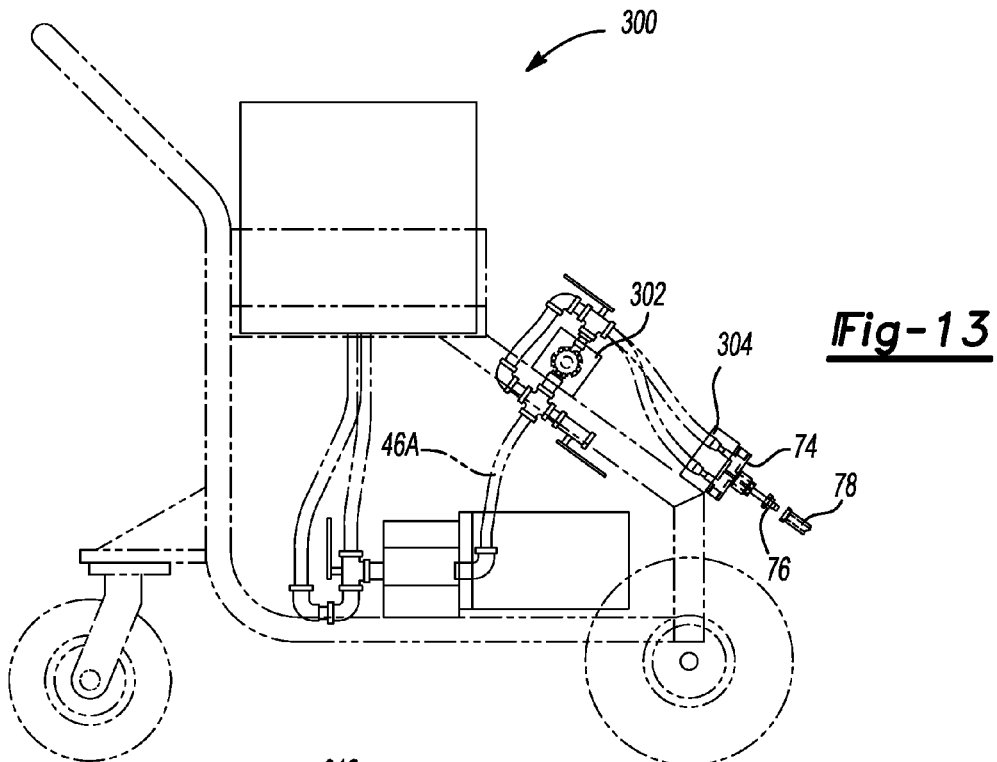
FIG. 13 is a side view of another embodiment of the device.
Figure 14:
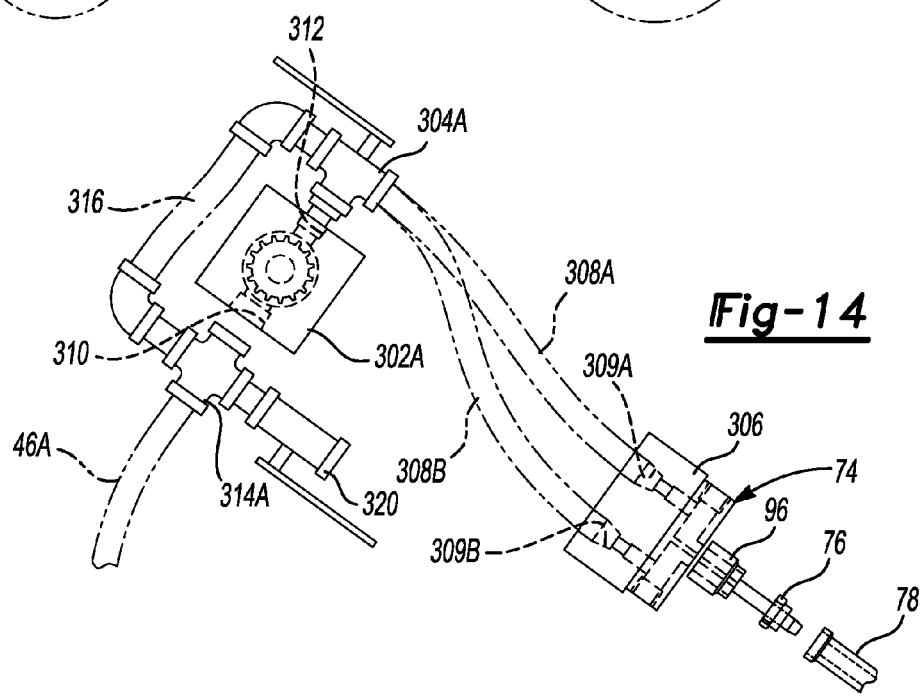
FIG. 14 is a side view of a portion of the device.
Figure 15:
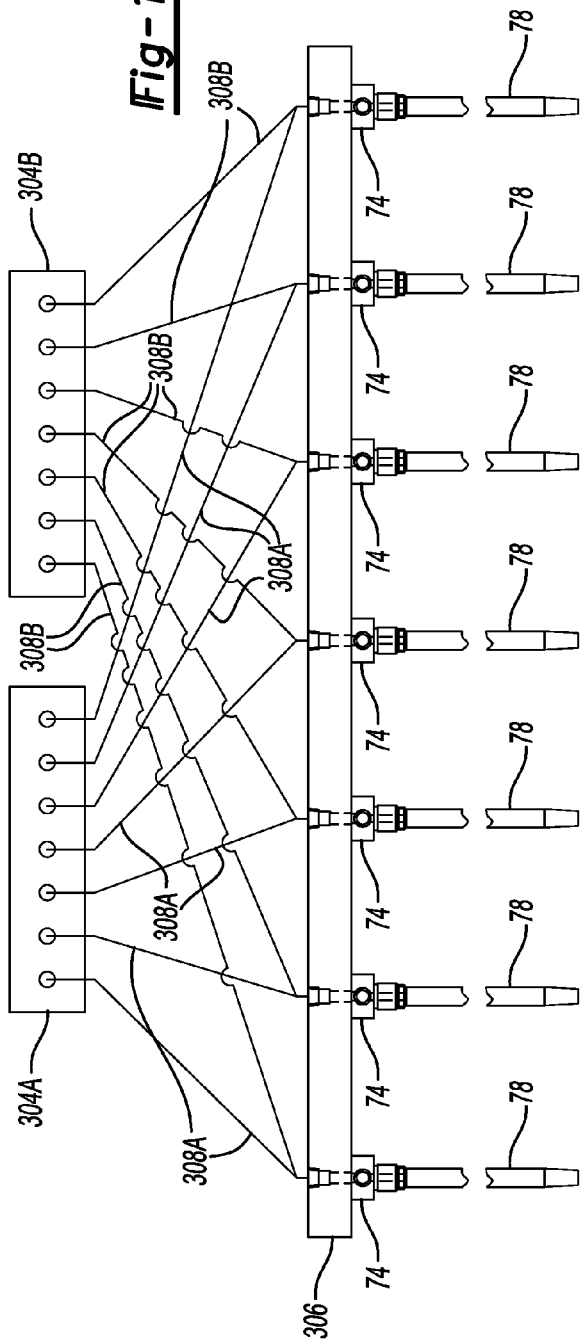
FIG. 15 is a connection diagram of the device.
Figure 16:
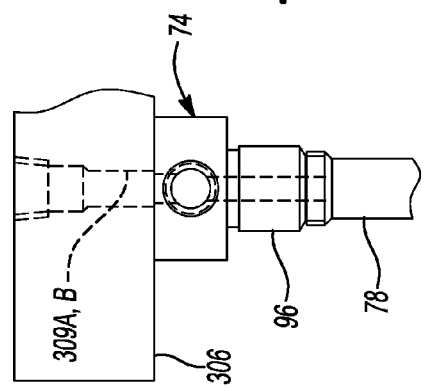
FIG. 16 is a partial view of a connection of the device.
Figure 17:
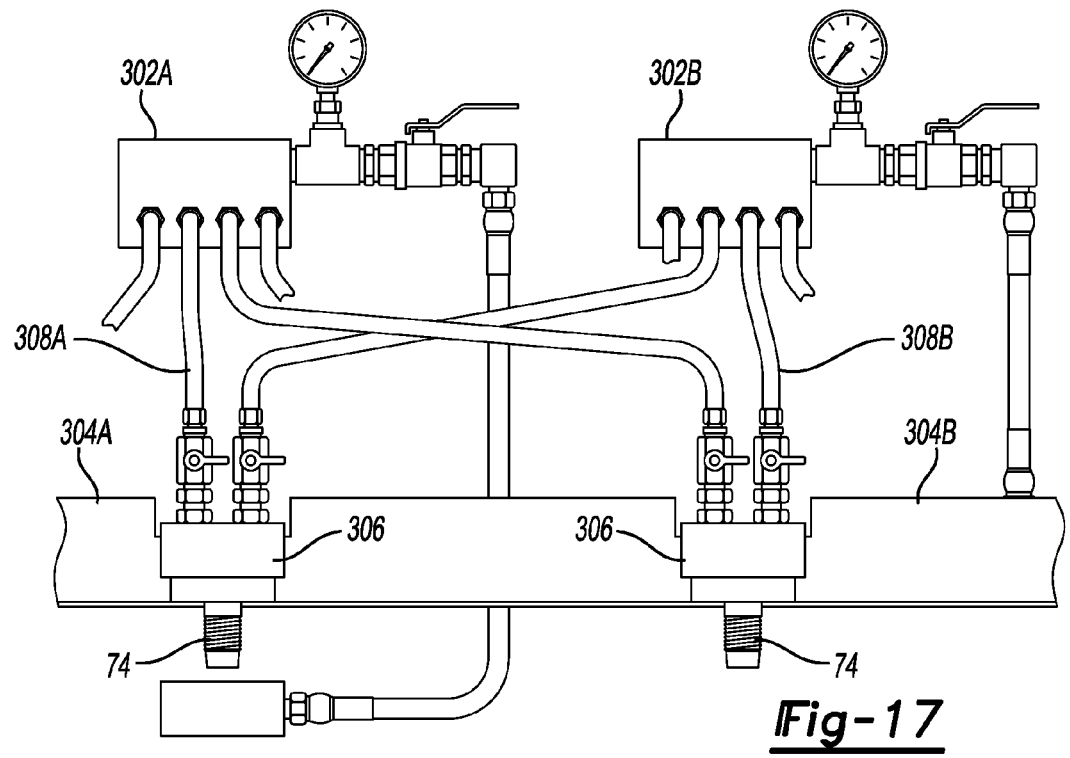
FIG. 17 is a view of a portion of the device.
Figure 18:
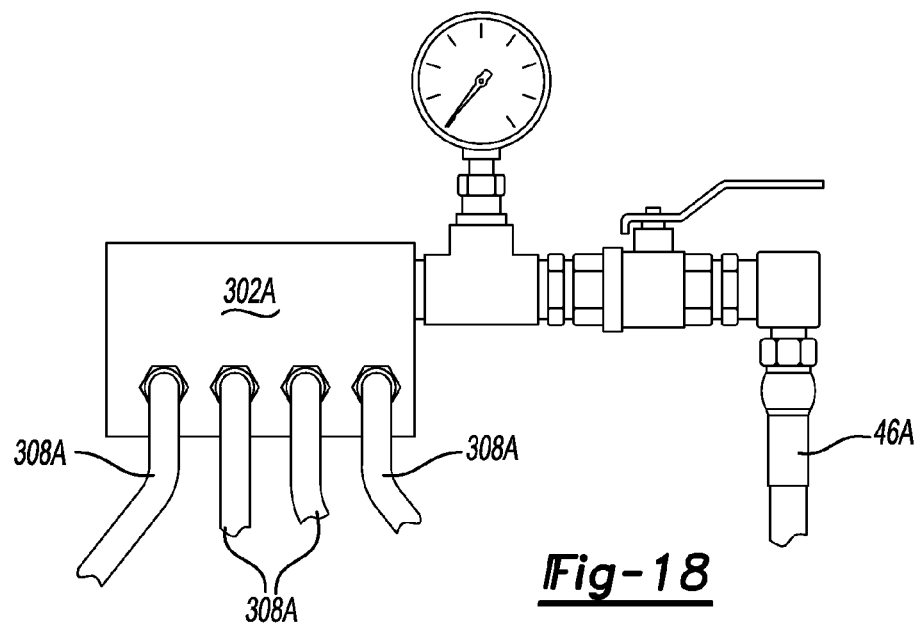
FIG. 18 is a view of another portion of the device.

Turning to FIG. 13, yet another alternate embodiment of the device 10 is generally indicated by reference number 300. The device 300 is similar to the device 10 described in FIGS. 1-8, and therefore like components are indicated by like reference numbers. However, the device 300 replaces the accumulators 50A and 50B with one or more flow dividers 302 and replaces the rotary valves 72 with a plurality of diverter valves 304A and 304B, and adds an adaptor plate 306 positioned between the plurality of diverter valves 304A and 304B and the plural component or dual manifolds 74. The present invention contemplates that in other embodiments of the invention additional flow dividers 302, diverter valves 304A, 304B and adaptor plates 306 than are illustrated in the Figures are utilized.

With reference to FIGS. 13-18, the flow dividers 302 include dividers 302A and 302B to receive "A" and "B" side fluids, respectively. Flow dividers 302A, 302B have a single input port 310 and a plurality of output ports 312. The number of output ports 312 depends on the number of diverter valves 304A, 304B and mixing nozzles 78 desired. The flow dividers 302A, 302B are connected to pumps 36A, 36B via lines 46A, 46B and four port couplings 314A and 314B. The flow dividers 302A, 302B uniformly divide flow of fluid from the input port 310 to the plurality of output ports 312. Thus, each of the output ports will have the same flow rate. Since each individual divider output port flow rate is uniform, if one output is blocked the others will also stop flow in response. The present invention contemplates that flow dividers 302A, 302B have different number and sized output ports.

The number of diverters 304A and 304B are matched to the number of output ports on flow dividers 302A and 302B. Diverters 304A and 304B are three way ball valves that may be actuated to completely shut of fluid flow to a particular nozzle 78. Diverters 304A and 304B receive fluid from the outlet ports 312 of the flow dividers 302A, 302B and communicate the fluid to the adaptor plates 306 via a plurality of feed lines 308A, 308B.

The adaptor plate 306 is connectable to the dual manifold 74 described in the previous embodiments. More specifically, adapter plate 306 includes two fluid passages or bores 309A, 309B for communicating fluid from feed lines 308A, 308B to each of the bores of dual manifold 74.

In an embodiment of the present invention, a fluid by pass 316 is provided to communicate fluid from the diverters 304A, 304B to inlet 310. The redirection or bypass of fluid flow through fluid by pass 316 from the inlet 310 of the divider to the outlet 312 of the divider keeps the fluid flow through the outlet ports of the divider all uniform when an individual nozzle does not have any or the same flow rate as the other nozzles.

The present embodiment further includes a two way ball valve 320 connected to the four way ball valve 314. Valve 320 allows fluid to be diverted to a hand held gun or similar bead dispenser (not shown). The bead dispenser may be connected to the end of a length of hose and the other end of the hose connected to the valve 320. A single bead dispensed through the gun allows the operator to apply an adhesive in congested areas where the dispensing cart simply will not fit.

Figure 19:
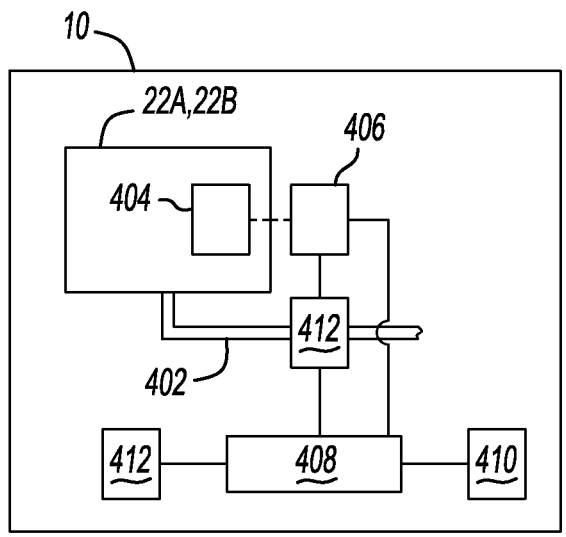
FIG. 19 is a schematic diagram of a control system used with the device.

Preferably, the present embodiment includes a quick release mixing nozzle 78 for faster change-outs. The quick release mixer nozzle has restriction orifice 76 integrated into the nozzle. The mixer nozzle 78 is configured to be quickly releasable from dual manifold 74 by eliminating the threads and attaching the nozzle to the dual manifold 74 via a latch 330 or similar device, as shown in FIG. 19. Such a latch 330 is available from SouthCo of Concordville, Pa.

The quick release mixer nozzle is an improvement over the industry standard which is a threaded attachment of the mixing nozzle to the dual manifold 74. Threaded nozzles are not preferred since they can easily get gummed up with adhesive and require cleaning.

Turning now to FIG. 19, the device 10 is illustrated schematically with either the "A" side package 22A or the "B" side package 22B. An outlet line 402 is coupled to the package 22A, 22B through which the compound within the package 22A, 22B is drawn by the pump 36A, 36B. Each individual package 22A, 22B includes an identifier 404. The identifier 404 is used to uniquely identify the particular package 22A, 22B. The identifier 404 may be located in various locations, for example on an inside or outside of the package 22A, 22B, embedded within the package 22A, 22B, located within, or attached to, a bag within the package 22A, 22B, or within the adhesive compounds themselves. The device 10 includes a reader 406. The reader 406 communicates with the identifier 404 through various methods, as will be described below. The identifier 406 in turn is in electrical communication with a controller 408. The controller 408 is preferably an electronic control device having a preprogrammed digital computer or processor, control logic, memory used to store data, and at least one I/O peripheral. The control logic includes a plurality of logic routines for monitoring, manipulating, and generating data. The controller 408 electrically communicates with various components of the device 10, such as the prime mover 30 or any manual controls indicated generally by reference number 410, and is operable to convert manual or automatic inputs into electrical signals that control the device 10.

A flow metering device 412 is connected to the outlet line 402. The flow metering device 412 is operable to detect a flow of the compound from the package 22A, 22B. A signal is communicated to the controller 408 indicative of the flow of the compound.

The identifier 404 and the reader 406 may take various forms. For example, the identifier 404 may be a radio frequency identifier (RFID) having a signal unique to the package 22A, 22B and the reader 406 may be a radio frequency receiver operable to detect the RFID from the identifier 404.

Figure 20:
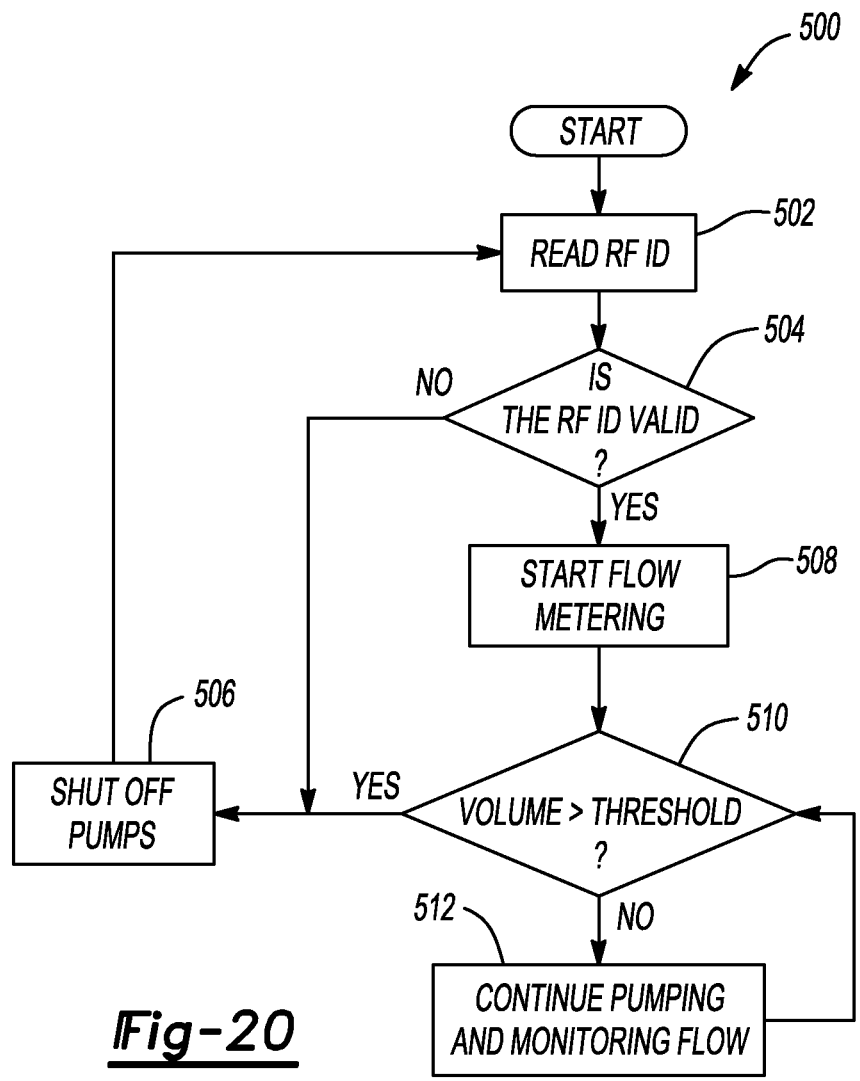
FIG. 20 is a flow chart illustrating a method of controlling the device.

Turning to FIG. 20 and with continued reference to FIG. 19, an exemplary method of using the RFID 404 and the receiver 406 is generally indicated by reference number 500. The method 500 begins at step 502 where the receiver 406 reads or detects the RFID 404. At step 504 the controller 408 analyzes the RFID signal and determines if the RFID signal is valid. A valid RFID signal may be one that is found in memory storage within the controller 408 (i.e. a previously stored value), one that conforms to an expected format (i.e. a certain number or digit length, etc., that is unique to the A side and B side packaging in order to prevent reversing the packaging on the device 10), and/or one that has not been previously recorded by the controller 408 and been blocked. If the detected RFID signal is not valid, the method proceeds to step 506 and the pumps 36A, 36B are shut off. This prevents incompatible compounds from being pumped through the device 10, such as compounds having low viscosities or inadvertently switching the A side with the B side. If the RFID signal is valid, the method proceeds to step 508 where the flow of the compound from the package 22A, 22B is monitored via the flow meter 412. At step 510 the controller 408 stores the RFID signal and associates the flow data with the RFID signal. The controller 408 then calculates a volume of compound that has flowed from the package 22A, 22B and compares this volume with a threshold. The threshold is equal to or greater than the expected volume of the compound within the package 22A, 22B. If the volume of compound is less than the threshold, the method proceeds to step 512 where the device 10 continues to allow pumping of the compound and monitors the flow of the compound and returns to step 510. If, however, the volume exceeds the threshold, the method proceeds to step 506 and the pumps 36A, 36B are automatically shut off. In addition, the controller 408 locks out the RFID signal such that it cannot be used again. A display device 412, such as a warning indicator or digital display screen connected to the controller 408, can indicate when the volume of the compound within the package 22A, 22B is running low, the estimated volume remaining, or any other associated information to a user of the device 10. By associating the RFID signal with the accumulated metered flow and storing these values in memory, a package 22A, 22B can be reused over time so long as the volume of the compound remains less than the threshold.

In one embodiment, the identifier 404 may be a unique bar code and the reader 406 may be a bar code scanner. The method of operating the device 10 would be the same as that described in FIG. 20. In another embodiment, the identifier 404 may be a unique number and the reader 406 may be a keypad. Again, the method of operating the device 10 would remain the same, however, the step 502 would include a user of the device 10 entering the unique identifier 404 into the keypad 406.

Figure 21:
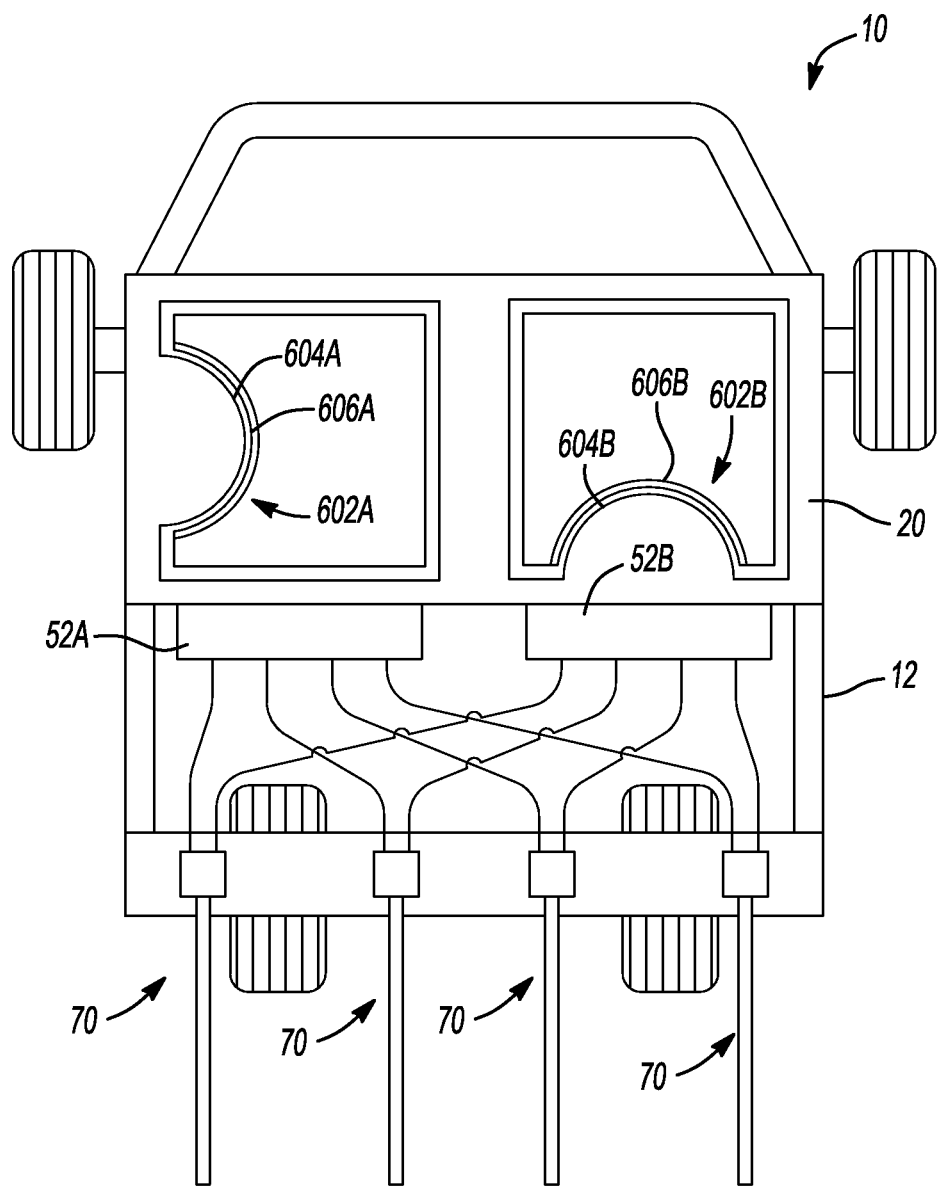
FIG. 21 is a schematic top view of an interlocking system used with the device.

Turning to FIG. 21, an embodiment of the device 10 is shown having interlock features 602A and 602B. It should be appreciated that the interlock features 602A, 602B are illustrated schematically in FIG. 21. Each interlock feature 602A, 602B includes a first interlock 604A, 604B and a second interlock 606A, 606B, respectively. The first interlocks 604A, 604B are disposed on the upper frame 20 of the carrier 12 that supports the packages 22A and 22B. Interlock 604A is disposed on the side of the upper frame 20 that supports the package 22A and the interlock 604B is disposed on the side of the upper frame 20 that supports the package 22B. The second interlocks 606A, 606B are disposed on the packages 22A and 22B, respectively. The interlock 606A is configured to only interlock or mate with the interlock 604A and the interlock 606B is configured to only interlock or mate with the interlock 604B. The interlocks 602A and 602B prevent the packages 22A and 22B from being connected to the device 10 on the wrong side, thereby preventing damage to the device 10.

The interlocks 602A and 602B may take various forms without departing from the scope of the present invention. For example, the interlock 604A may be a protrusion on a side of the upper frame 20 and the interlock 604B may be a protrusion on a front of the upper frame 20. Accordingly, the interlock 606A would be a recess sized to accommodate the protrusion interlock 604A and the interlock 606A would be located on a short or long side of the package 22A. The interlock 606B would be a recess sized to accommodate the protrusion interlock 604B and the interlock 606B would be located on whichever of the short or long side of the package 22B that does not correspond with the location of the interlock 606A on the package 22A. In another embodiment, the interlocks 604A and 606B may be on the same sides of the upper frame 20 but have different sizes or shapes. Accordingly, the interlocks 606A and 606B would be on the same sides but would have shapes corresponding to the interlocks 604A and 604B, respectively.

Figure 22:
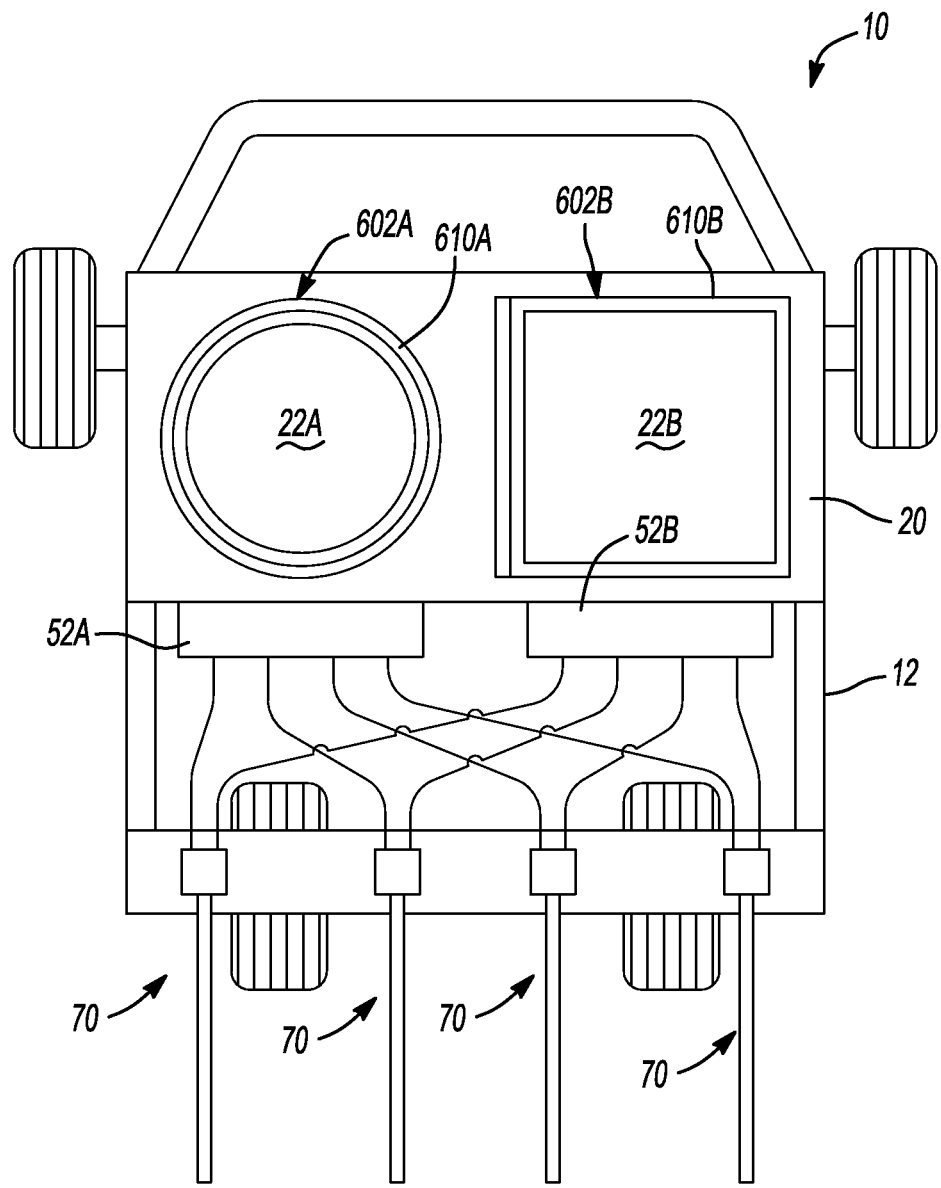
FIG. 22 is a top view of an embodiment of the interlocking system used with the device.

Another example of the interlocks 602A and 602B is shown in FIG. 22. The interlock 602A includes a round receiver 610A located in the upper frame 20 and the package 22A has a round cross-section configured to fit within the round receiver 610A. The interlock 602B includes a rectangular or square receiver 610B and the package 22B has a rectangular or square cross-section configured to fit within the rectangular or square receiver 610B.

Figure 23:
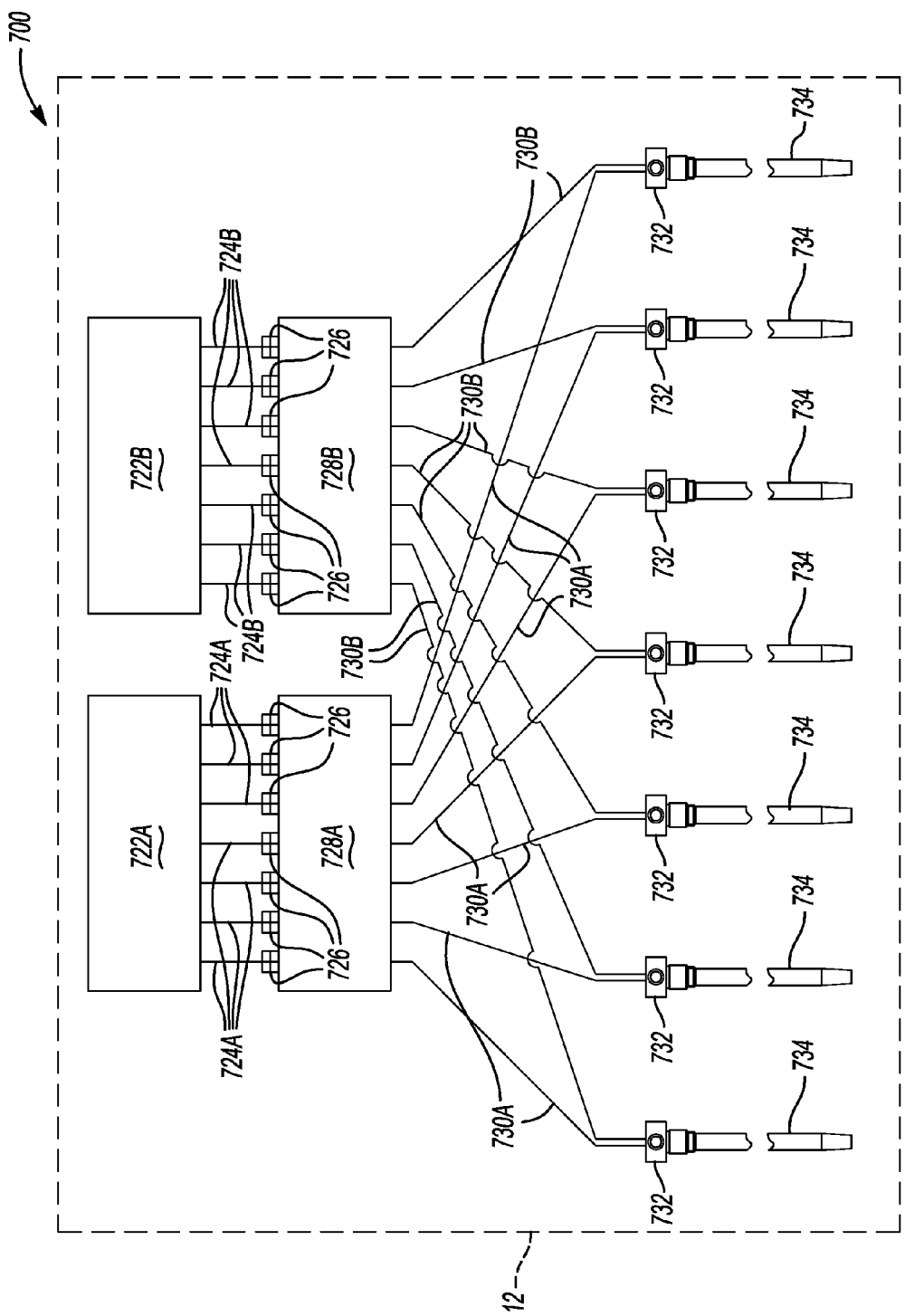
FIG. 23 is a schematic view of another embodiment of the device.

Referring to FIG. 23, a device for applying a two-part fluid to a substrate is generally indicated by reference number 700. The device 700 may include a carrier or frame like the frame 12 described in the previous embodiments. The carrier or frame 12 is used to support the various components of the device 700 and may take many forms without departing from the scope of the present invention. In the example provided, the carrier 12 includes a rectangular base with an upwardly extending portions or support columns. The rectangular portion includes two rotatable front wheels and two spindle mounted back wheels. Back wheels are pivotable and rotatable allowing the device 700 to move forward as well as turn and rotate. The portion supports an upper frame that is sized to receive two parts of a two-part compound. These two parts are packaged separately and include an "A" side package 722A and a "B" side package 722B. Each of the packages preferably contain one part of a two part all weather polyurethane adhesive for use on roofing substrates. The upper frame is designed to accommodate a particular package configuration of the A side 722A and the B side 722B. While in the example provided the A side 722A and B side 722B are illustrated as having a rectangular box packaging system, it should be appreciated that other shaped packaging systems may be supported by the upper frame 20. Each of the packages 722A and 722B may be a bag with one or more hoses 724A and 724B, respectively, extending from each bag. In the example shown in FIG. 23, seven hoses 724A extend from bag 722A and seven hoses 724B extend from bag 722B, and a shut-off valve 726 is associated with each hose to enable the operator of the device 700 to selectively open or close each of the hoses 724A, 724B. The device 700 or any of the previous following devices may have an extension with additional nozzles on either or both sides of the nozzles 134. These extensions may project longitudinal from the sides of the cart 12 or they may be hinged that flip out to the sides of the cart 12.

Each of the hoses 724A, 724B connects to respective peristaltic pumps 728A, 728B. Specifically, the seven hoses 724A extending from package 722A connect to pump 728A, and the seven hoses 724B extending from package 722B connect to pump 728B. In another arrangement, all of the hoses 724A and 724B from the packages 722A and 722B connect to a single pump. In a particular arrangement, each of the hoses 724A and 724B connects to a single peristaltic pump. In any of the arrangements, the peristaltic pumps may be driven by a combustion engine, a battery, or electricity from a wall outlet. The combustion engine may be fueled by propane or any other suitable liquid or gaseous fuel.

In the present embodiment, a set of seven outlet hoses 730A extends from the peristaltic pump 728A and another set of outlet hoses 730B extends from the peristaltic pump 728B. Each of the outlet hoses 730A is paired with a respective outlet hose 730B, and each of the paired outlet hoses 730A and 730B connects to respective inlet ports 731A and 731B of a manifold 732. Accordingly, in this embodiment, there are seven manifolds, each associated with a pair of outlet hoses 730A and 730B, and associated with each manifold 732 is a mixer nozzle 734. The manifolds 732 may be made from aluminum or from a disposable plastic. The manifolds 732 may be the same as the dual manifolds 74 described in the previous embodiments. Accordingly, each of the manifolds 732 may include two inlet ports that communicate with separate channels or bores which in turn communicate with respective outlet ports.

The nozzle 734 may be an extended member that mixes the "A" side fluid with the "B" side fluid. The nozzle 734 is coupled to manifold 732 and communicates with the outlet ports of the manifold 732. The nozzle 734 is disposable and is preferably a 36 element mixing nozzle, though it should be appreciated that other types and grades of nozzles may be employed without departing from the scope of the present invention. Once the fluids from the "A" and "B" sides are mixed, the combined fluid exits in the nozzle 734 and is dispensed in the form of elongated beads on the roofing substrate. A restriction orifice like the orifice 76 described earlier may be disposed between the manifold 732 and the nozzle 734. The orifice may be integrated into the nozzle. The nozzle 734 may be threaded into the manifold 732 or it may be a quick release nozzle for faster change-outs. The mixer nozzle 734 may be configured to be quickly releasable from the manifold 732 by eliminating the threads and attaching the nozzle to the manifold 732 with a latch 330 or similar device, as shown in FIG. 19

When the device 700 is in use, an operator activates the device 700 to drive the pumps 728A and 728B. The pumps 728A and 728B such fluid from the "A" and "B" side packages 722A and 722B through the hoses 724A and 724B, respectively, that have not been closed with shut-off valves 726. In turn, the pumps 728A and 728B pump the "A" and "B" fluids through the outlet hoses 730A and 730B to the manifolds 732. Accordingly, each manifold 732 receives "A" and "B" and directs the fluids to respective nozzles 734 for mixing. The pumping action of the pumps 728A and 728B ejects the mixture through the outlet of the nozzle 734 as a foam adhesive that is applied to a substrate such as a roof. By widening or narrowing the distance between adjacent nozzles 734, the operator can adjust the width of the area covered with the device 700.

Figure 24:
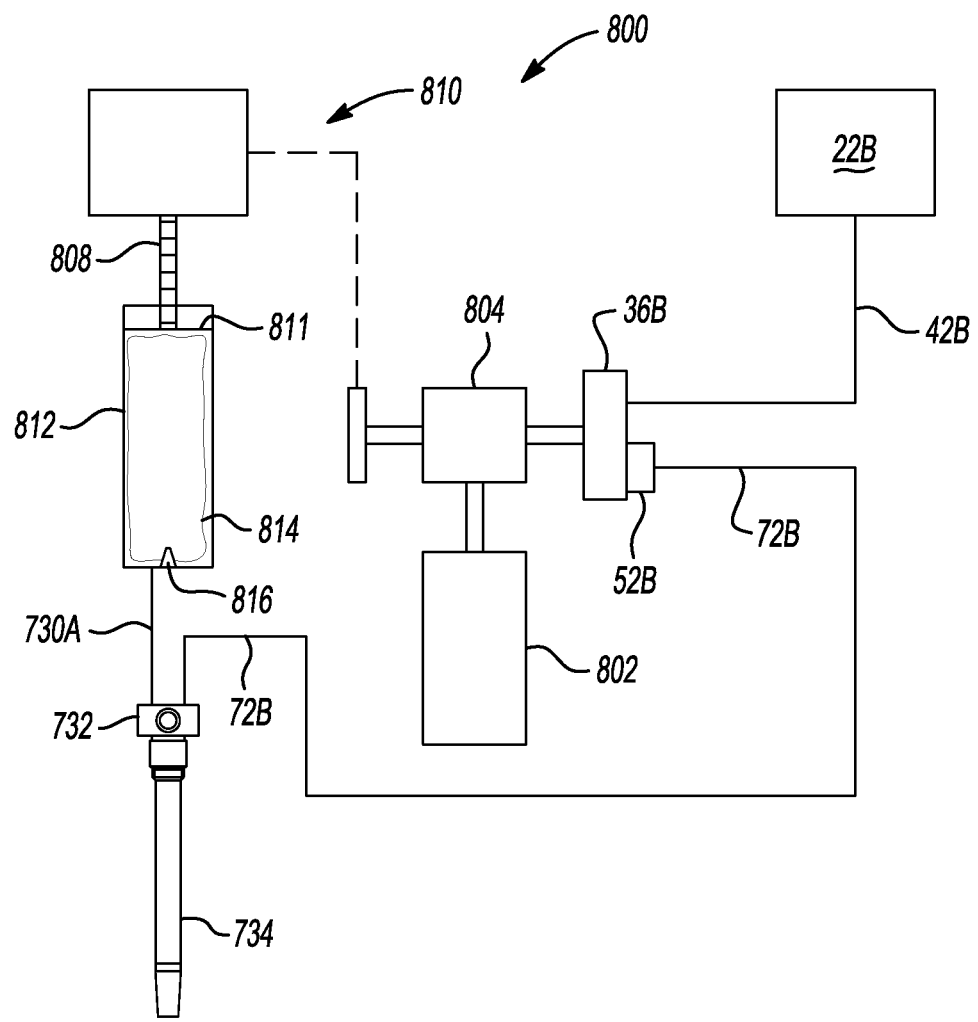
FIG. 24 is a schematic view of yet another embodiment of the device.

Turning now to FIG. 24, there is shown another embodiment of a device generally indicated by the reference number 800. Note that like components are indicated by like reference numbers of the previously described embodiments. The primary components of the device 800 include a motor 802 connected to a gear box 804. In turn, the gear box 804 is connected to the pump 36B that such "B" fluid from "B" package 22B via hose 42B and pumps "B" fluid through the manifold 52B and the hoses 72B to the manifolds 732.

The gear box is also connected to a jack and ball screw mechanism 808 via a mechanism 810 that can be a ring and pinion mechanism or a chain and sprocket mechanism. A disk member 811 is attached to one end of the jack and ball screw mechanism 808. Also associated with each jack and ball screw mechanism 808 is a cylinder or tube 812. Typically, the operator of the device 800 drops a sausage package 814 of "A" fluid into the tube 812. A sharp projection 816, for example, at the bottom of the tube 812, pierces the package 814. Accordingly, as an operator, such as a roofer, operates the device 800, the motor 802 turns the gears in the gear box 804 that in turn causes the jack and ball screw mechanism 808 via the mechanism 810 to push the disk 811 against the package 814. This causes the "A" fluid to be pushed out of the package 814. The "A" fluid flows through respective hoses 730A to the manifold 732, and, as described previously, the "A" and "B" fluids are mixed together in the nozzle 734, and the mixture is ejected as an adhesive foam onto a substrate such as a roof. Although FIG. 24 shows device 800 arranged with one nozzle, depending upon the application, there may as many as seven or more nozzles 734 associated with the device 800. In particular arrangements, each nozzle is associated with a respective cylinder 812 and jack and ball screw mechanism 808.

Referring now to FIGS. 25A and 25B, there is shown yet another embodiment of a device 900 for applying a two-part adhesive. Note that like components are indicated by like reference numbers shown in the previous embodiments. The device 900 includes a cart 902 with a pair of drive wheels 904 and another pair of wheels 906 that are pivotable to allow the device 900 to turn and rotate. The device 900 further includes a motor 903 that pivots a turret 908. Extending from the turret 908 is an arm 910. The device 900 may include a mechanism 901 such as gear pump, a peristaltic pump, or jack and ball screw mechanism similar to those described previously.

In a particular arrangement, the device 900 includes an "A" fluid package and a "B" fluid package, each connected to a single respective hose 724A and 724B. The mechanism 901 sucks each fluid from the "A" and "B" packages via the hoses 724A and 724B and pumps the fluids through hoses 730A and 730B, respectively, that extend along the arm 910. Mounted at the end of the arm 910 is a manifold 732, similar to those described previously, which receives the "A" and "B" fluids. In turn, the manifold 732 directs the "A" and "B" fluids to the nozzle 734 where the fluids are mixed together to form a foam adhesive that is ejected from the end of the nozzle 734 onto a roof.

When the device 900 is in operation, the drive wheels 904 rotate at a desired angular velocity such that the device 900 travels along a path 920 in the direction 930 at a desired speed while the motor 903 swings the turret 908 and hence the arm 910 back and forth at a desired rate. Meanwhile as the arm swings back and forth the foam adhesive is ejected from the end of the nozzle 734 in a single a serpentine pattern 924 on a roof, as shown in FIG. 26.

The description of the invention is merely exemplary in nature and variations that do not depart from the gist of the invention are intended to be within the scope of the invention. Such variations are not to be regarded as a departure from the spirit and scope of the invention.

What is claimed is:

1. A device for applying a two-part adhesive to a substrate, the device comprising:

a carrier having at least one set of wheels that enable the carrier to move and turn;

a first pump mounted on the carrier and having a plurality of inlets a shut-off valve associated with each inlet that enable selective operation of the inlet and a plurality of outlets, the first pump pumping a first part of the two-part adhesive from the plurality of inlets of the first pump to the plurality of outlets of the first pump, the number of the inlets of the first pump being equal to the number of outlets of the first pump;

a second pump mounted on the carrier and having a plurality of inlets a shut-off valve associated with each inlet that enable selective operation of the inlet and a plurality of outlets, the second pump pumping a second part of the two-part adhesive from the plurality of inlets of the second pump to the plurality of outlets of the second pump, the number of the inlets of the second pump being equal to the number of inlets of the first pump and the number of outlets of the second pump being equal to the number of outlets of the first pump;

a plurality of manifolds, the number of manifolds being equal to the number of outlets of the first pump and, hence, the number of outlets of the second pump, each manifold having a pair of inlets in communication with respective outlets of the first pump and the second pump and further having a pair of outlets in communication with respective inlets of the manifold; and a plurality of applicators, the number of applicators being equal to the number of manifolds, each applicator having a first end that communicates with the outlets of a respective manifold, each applicator having a second end that is an outlet, wherein each applicator is configured to mix the first part with the second part to form the two-part adhesive, and wherein the two-part adhesive is discharged from the outlet of each applicator onto the substrate.

2. The device of claim 1 wherein the shut off valve associated with each inlet is disposed between a source of the first part of the two-part adhesive and the first pump and and wherein the shut-off valve associated with each inlet is disposed between a source of the second part of the two-part adhesive and the second pump.

3. The device of claim 1 wherein each applicator includes a mixing nozzle that mixes the first part with the second part.

4. The device of claim 3 wherein the mixing nozzle is disposable.

5. The device of claim 3 wherein the mixing nozzle is a quick connect nozzle.

6. The device of claim 1 wherein the first pump and the second pump are peristaltic pumps.

7. The device of claim 1 wherein the first pump and the second pump are the same pump.

8. The device of claim 1 wherein the first pump is a jack and ball screw mechanism.

9. The device of claim 8 wherein the first part is contained in a sausage package.

10. The device of claim 9 wherein the first pump includes a cylinder that contains the sausage package and further includes a projecting device that pierces the sausage package to release the first part.

11. The device of claim 8 wherein the second pump is a gear pump.

12. The device of claim 8 wherein the jack and ball screw mechanism is driven by a ring and pinion mechanism.

13. The device of claim 8 wherein the jack and ball screw mechanism is driven by a chain and sprocket mechanism.

14. The device of claim 1 wherein the first pump and the second pump are battery driven.

15. The device of claim 1 wherein the first pump and the second pump are driven by an internal combustion engine.

\* \* \* \* \*